United States Patent [19]

Ogden et al.

[11] 4,224,423

[45] Sep. 23, 1980

[54] RESIN MANUFACTURE

[75] Inventors: Dennis H. Ogden, Wolverhampton; George Inverarity, Kingswinford, both of England

[73] Assignee: British Industrial Plastics Limited, England

[21] Appl. No.: 911,870

[22] Filed: Jun. 2, 1978

[30] Foreign Application Priority Data

Jun. 11, 1977 [GB] United Kingdom ............... 24458/77

[51] Int. Cl.$^3$ ..................... C08L 61/24; C08L 61/28; C08G 12/12; C08G 12/32
[52] U.S. Cl. ................................... 525/515; 528/254; 528/256; 528/259
[58] Field of Search ....................... 528/254, 231, 256; 260/849; 525/515

[56] References Cited

U.S. PATENT DOCUMENTS

| | | | |
|---|---|---|---|
| 2,898,324 | 8/1959 | Mackay | 528/256 |
| 3,896,087 | 7/1975 | Brunnmueller et al. | 260/849 |
| 3,979,341 | 9/1976 | Widmann | 260/849 |
| 3,994,850 | 11/1976 | Willegger et al. | 260/849 |
| 4,035,328 | 7/1977 | Huang et al. | 260/849 |
| 4,092,277 | 5/1978 | Moore | 260/849 |

*Primary Examiner*—Wilbert J. Briggs, Sr.
*Attorney, Agent, or Firm*—William A. Drucker

[57] ABSTRACT

A method for the manufacture of an aminoformaldehyde resin. An amino compound is reacted with formaldehyde or paraformaldehyde in the liquid phase the latter being ensured by the presence of a reactive modifier in the reaction mixture. The reactive modifier comprises an amino-formaldehyde resin which is capable of reaction with further monomers and capable of rendering the mixture of reactants liquid at least at the temperature at which the reaction is to be carried out.

9 Claims, No Drawings

RESIN MANUFACTURE

TECHNICAL FIELD

This invention relates to the manufacture of resins, and in particular the manufacture of aminoformaldehyde resins.

Amino-formaldehyde resins are manufactured on a large scale and used in moulding powders, foams for cavity wall insulation etc, for adhesives and in textile finishing. The most commonly used amino compounds are urea and melamine and their derivatives.

BACKGROUND ART

The usual commercial method for the manufacture of aminoformaldehyde resins such as urea-formaldehyde or melamine-formaldehyde resins is to react the amino compound and formaldehyde in an aqueous system at a temperature of 60° to 90° C.

The product in such cases will inevitably contain a large amount of water which for many uses has to be removed.

Thus the manufacture of moulding powders from such resins requires a lengthy process in which a large volume of water has to be removed.

We have also found that in the production of foam from urea-formaldehyde resin, as used, for example, for insulation purposes, foams of superior resilience may be produced from resins of low water content as described in our U.K. Patent Application No. 51269/77.

It has been disclosed (U.S. Pat. No. 1,985,937) that polyhydric alcohols can be reacted with methylol ureas, methyl esters thereof, or dimethyl thiourea to give a clear viscous solution.

It has been disclosed (U.S. Pat. No. 1,986,067) that urea can be reacted with a glycol and the product condensed with formaldehyde to give a resinous product.

Finally it has been disclosed (U.K. Pat. No. 1,107,245) that a polyetherurea can be obtained by reacting formaldehyde with glycol to produce a hemiformal, and then reacting the hemiformal with urea or thiourea.

However, in each of these three prior art disclosures the end product is a material containing a high proportion of glycol which has totally unsatisfactory properties when considered as replacement for modern urea-formaldehyde or melamine-formaldehyde resins.

It has been proposed (U.K. Pat. No. 1,390,370) to make amino-formaldehyde resins by reaction, in the absence of solvent, of urea or thiourea, paraformaldehyde, and hexamethylene tetramine in a molar ratio in the range from 1:1.1:0.01 to 1:25:0.2. This proposal, however, suffers from the difficulty that in the solid phase, reaction control is virtually impossible and a consistently satisfactory end product is not obtained.

The present invention is thus concerned with the problem of providing a process for the preparation of amino-formaldehyde resins of lower water content than by the conventional aqueous system, yet avoiding the difficulties of solid phase reaction.

We propose a solution to this problem in the specification of our co-pending U.K. Patent Application No. 21751/77 in which we describe a method for the manufacture of an amino-formaldehyde resin which comprises reacting an amino compound with formaldehyde or paraformaldehyde at a temperature above 60° C. in the liquid phase, the liquid phase being ensured by the presence of a minor proportion of a reactive modifier being a compound capable of taking part in said reaction and also capable of modifying the mixture of reactants to be liquid at the temperature at which the reaction is to be carried out. Examples are given in that specification of the production of low-water content resins using various different compounds as reactive modifiers. The products so made are useful resins, but the reactive modifiers described are compounds which not only modify the reaction system to the liquid phase at the reaction temperature, but also modify the properties of the resulting resin from those of a simple urea-or melamine-formaldehyde resin.

The present invention has as its primary objective the preparation of amino-formaldehyde resin of lower water content than those obtained by the conventional aqueous system, whilst avoiding the need to use compounds which will modify the properties of the resin produced.

DESCRIPTION OF THE INVENTION

According to the present invention a method for the manufacture of an aminoformaldehyde resin comprises reacting an amino compound with formaldehyde or paraformaldehyde in the liquid phase characterized in that said compounds are reacted in the presence of a reactive modifier to ensure said liquid phase, said modifier comprising an aminoformaldehyde resin capable of reaction with further monomers, and which is capable of rendering the mixture of reactants liquid at least at the temperature at which the reaction is to be carried out.

The reaction is preferably carried out at a temperature above 60° C. and more preferably in the range 70° C. to 115° C.

In carrying out the method of this invention water may be omitted, or if added, the amount of water present in the reaction mixture (excluding water formed in the condensation reaction) is preferably less than 6% by weight of the total mixture.

Although these low water contents in the initial reaction mixture are preferred, low molecular weight liquid resins of low water content are not freely available to use as starting materials at the present time. Thus, we find that a high solids content aqueous solution of a reactant resin (i.e. one capable of reacting with further monomers) can be used successfully as a reactive modifier. The end product when using such a modifier is of lower water content than the products of the usual method of producing such resins. Clearly if desired these products could be used as reactive modifiers in turn, with a correspondingly lower water content in the reaction mixture.

The reactive modifier, i.e. the initial aminoformaldehyde resin; will, when the reaction is completed, form part of the resin produced. The function of the reactive modifier in the method of this invention is to render the reactant mixture a liquid at the temperature of reaction so that the reaction can be carried out in a liquid phase.

The aminoformaldehyde resin used as reactive modifier may be a resin containing the same monomers in the same ratio as the resin being manufactured. However, this need not necessarily be the case and the reactive modifier resin may contain different proportions of monomers, and/or additional or different monomers as desired, provided that it remains capable of carrying out its function as reactive modifier.

Thus the present invention provides a method for manufacturing mixed resins, as well as a means of making aminoformaldehyde resins of low water content.

For example, a urea formaldehyde resin may be produced, using a melamine-formaldehyde resin as the reactive solvent, or vice-versa.

The proportion of the resin used as reactive modifier in the reaction mixture will depend upon the proportion desired, particularly when making a mixed resin, but also will be limited by the extent to which it is capable of liquifying the reaction system. For instance if the reactive modifier is a liquid resin in which the other reactants are highly soluble it need be used in a proportion lower than would be the case if the other reactants were less soluble in it.

In general, however, the molar proportion of the resin used as reactive modifier to the total reactants will not be greater than 40% and will preferably be substantially less.

The formaldehyde, e.g. paraformaldehyde and the amino compound are generally added to the reactive modifier separately, whilst warming the mixture, to form the reaction mixture in the desired liquid phase. The pH of the system during this stage is alkaline. When the three reactants are in the liquid phase the final condensation may be accelerated by acidifying the reaction mixture if this is desirable, but in many cases, particularly when melamine is the amino compound, there is no need to accelerate the reaction in this way.

If the reaction mixture is acidified, the final product is subsequently neutralized or made alkaline before storage.

Other ingredients may be added to the reaction mixture in the normal manner, a particularly useful ingredient when making a urea/formaldehyde resin to be foamed being low molecular weight, partly reacted melamine/formaldehyde resin which improves the film-forming properties of the resin produced.

The invention may be used in conjunction with the method for manufacturing an aminoformaldehyde resin described in our co-pending U.K. Patent Application No. 21751/77.

EMBODIMENTS OF THE INVENTION

The invention will now be particularly described by means of the following Examples.

EXAMPLE 1

This example illustrates the preparation of a resin from urea, paraformaldehyde and urea-formaldehyde resin. The reagent quantities used are detailed in Table 1.

TABLE 1

| Reagent | Reagent quantity (g) |
|---|---|
| UF resin (BU700) | 840 |
| Urea (prilled) | 1338 |
| 91% paraform | 923 (includes 83g of H$_2$O) |

This formulation gives a theoretical solids content of 93.0% and an overall urea:formaldehyde molar ratio of 1:1.33.

The preparation of the resin was carried out in a 5 liter split reactor fitted with a stainless steel agitator, a thermometer pocket a reflux condenser and a heating mantle.

The procedure followed in preparing the resin is expressed below in tabular form in Table II.

TABLE II

| Time (Mins) | Temperature inside reaction vessel (°C.) | Notes |
|---|---|---|
| 0 | R.T. | liquid UF resin charged to reaction vessel. Heating commenced. |
| 40 | 68 | Paraformaldehyde addition begin. |
| 50 | 88 | pH 8 approx. ⅓ of paraform addition completed. |
| 60 | 86 | pH 8 approx ⅔ of paraform addition completed. |
| 70 | 84 | pH 7.5 addition of paraform complete. Reaction mix is low viscosity, almost clear, solution with small particles of solid material suspended in it. pH adjusted to 9 with 40% NaOH solution. |
| 100 | 88 | Addition of urea commenced, pH 7.5, heating discontinued. |
| 110 | 87 | ⅓ of the urea had been added, the pH was 7 and adjusted to pH 8.5 using 40% NaOH. |
| 120 | 77 | ⅔ of the urea had been added, the pH was 8, and adjusted to pH 9. Heating was recommenced. |
| 135 | 70 | Urea addition complete, pH was 7.5 and was adjusted to 8.5 |
| 145 | 78 | Heating was discontinued and the pH of the mixture was maintained at 8 to 8.5 as exothermic reaction continued |
| 150 | 87 | — |
| 160 | 83 | — |
| 180 | 76 | — |
| 240 | 58 | — |
| 280 | 49 | The resin was cooled to ambient temperature and a medium viscosity cloudy resin was obtained. |

The resin was soluble in water, yielding a cloudy solution.

After standing for 8 days an ambient temperature the resin had set to a firm white paste. This could be dispersed in cold water to yield a milky dispersion of pH 9. It was almost completely soluble in boiling water yielding a faintly opalescent solution containing traces of a gelatinous suspension.

EXAMPLE 2

This example illustrates the preparation of a resin from urea, paraformaldehyde, urea-formaldehyde resin and melamine formaldehyde resin.

In this case the melamine-formaldehyde resin, paraformaldehyde and urea are dissolved in turn in the U.F. resin under alkaline conditions and then allowed to react under acid conditions.

The reagent quantities used are detailed below in Table III.

Table III

| Reagent Quantity | Reagent | Notes |
|---|---|---|
| 1200 g | U.F. resin in water (76% reactive solids) | The ratio of Urea to formaldehyde in the resin is 1:1.6. |
| 402 g | Melamine-formaldehyde | 10% w/w based on other reagents |

Table III-continued

| Reagent Quantity | Reagent | Notes | |
|---|---|---|---|
| 1320 g | resin BL 35 Paraform (91%) | 40 moles F | U/F ratio |
| 1500 g | Urea | 25 moles U | = 1:1.6 |

The U.F. resin was charged to a reaction vessel provided with a heating/cooling jacket and fitted with a stirrer, thermometer and reflux condenser. The pH of the resin was adjusted to 10 with 40% NaOH and heating and stirring commenced.

When the temperature in the vessel had reached 35° C. gradual addition of the BL35 M.F. resin was commenced, the total addition taking 15 minutes and the temperature rising to 56° C. during that period. The temperature was then increased gradually to 78° C. when gradual addition of the paraformaldehyde was commenced. During addition of the paraform, which took 55 minutes, the pH was maintained above 8 by addition of 40% NaOH as necessary (2 ml NaOH added together) and the temperature was held at 85° to 90° C.

Gradual addition of urea was then commenced with the heating off, the temperature and pH being held as for the paraform addition, heating and adding 40% NaOH as necessary.

When the urea addition was complete the pH of the mixture was allowed to fall to 6 and 2 ml of Ammonium Sulphamate added, the reaction being continued over the following 45 minutes. During the reaction the temperature was held in the range 85° to 90° C. and the pH in the range 5½ to 7 by periodic additions of Ammonium Sulphamate. After the 45 minutes the pH was raised to 8½ by adding 3 ml of NaOH and forced cooling of the reaction vessel was begun.

A hazy resin solution was obtained having a viscosity of 13,360 poise at 24½° C. and a low water content.

EXAMPLE 3

This example illustrates the use of an aqueous solution of a melamine-formaldehyde resin as reactive modifier in the preparation of a melamine formaldehyde resin.

The reagents used are tabulated below in Table IV.

TABLE IV

| Reagent | Quantity (g) | Moles |
|---|---|---|
| Distilled Water | 300 | |
| M.F. Resin (BL 34)* | 300 | |
| Paraform (91%) | 660 | 20 |
| Melamine | 840 | 6⅔ |

*BL 34 resin is a spray-dried Melamine-Formaldehyde resin of M:F ratio 1:2.0, containing 2% free moisture and an SRY solids content of 93%.

(Its usual use is in impregnation of print and overlay papers in laminating)

This formulation gives a total water content of 17% by weight in the reaction mixture.

The procedure followed in preparing the resin is expressed in tabular form below in Table V.

TABLE V

| Time (Mins) | Temperature inside reaction vessel (°C.) | pH | Notes |
|---|---|---|---|
| 0 | 24 | | Water charged and heated |
| 15 | 40 | | BL 34 resin addition begun |
| 20 | 42 | 9 | BL 34 addition complete, some undissolved lumps |
| 30 | 52 | 9 | Paraform addition begun |
| 40 | 42 | 8½ | Paraform addition complete, Stirrable slurry, temperature increasing |
| 50 | 85 | 6 | 5 ml 70 TW NaOH added raising pH to 9. Clear solution obtained. Melamine addition begun, dissolving readily with exotherm. |
| 100 | 80 | 9 | Melamine addition complete later additions not yet dissolved, solution opaque, further 6 ml 70 TW NaOH has been required to keep pH above 8 |
| 110 | 84 | 10 | Opaque solution clearing, temperature increased |
| 120 | 90 | 9¼ | Clear resin, some undissolved lumps (insoluble) |
| 125 | 89 | 9 | Resin run off into bottles and cooled |

The resin produced had a viscosity of 22,560 poise at 24° C. and an SRY solids content of 77.7%.

EXAMPLE 4

This example illustrates the preparation of a mixed resin using a Uron resin as reactive modifier and urea and paraform as the other reactants. The reagents used are detailed in Table VI.

TABLE VI

| Reagent | Quantity | Moles |
|---|---|---|
| Bis(methoxymethyl) uron resin | 600 g | |
| 91% Paraform | 330 g | = 20 moles formaldehyde |
| Urea | 300 g | 10 |

The bis(methoxymethyl) uron resin is a liquid with a solids content of 95% to 100%.

The procedure followed was as follows. The uron resin was charged to a reaction vessel, stirred and heated. The pH of the resin was 8.5. When the temperature reached 62° C. paraform addition was commenced, the temperature being kept in the range 60° to 65° C. and the pH at 8.5. The paraform addition was complete after 30 mins, and the mix was maintained at 62° to 64° C. for a further 75 mins. The paraform was not completely dissolved. Urea addition was then begun, maintaining the same temperature and pH, and was completed in 60 mins during which time the solids were dissolving giving a white opaque resin. After a further 28 mins the solids were totally dissolved, the pH was 7½ and the resin was opaque. Heating was stopped and the liquid resin gradually cleared.

When cold the resin slowly became a white paste.

EXAMPLE 5

This example illustrates the preparation of a mixed resin using a methylated melamine-formaldehyde resin as reactive modifier, and urea and paraform as the other reactants.

The reagents used are detailed below in Table VII

TABLE VII

| Reagent | Quantity (g) | Moles |
|---|---|---|
| Methylated Melamine formaldehyde resin BC309*(90% solids) | 800 | |
| Paraform (91%) | 440 | = 13⅓ moles formaldehyde |
| Urea | 400 | 6⅔ moles |

*BC 309 is a liquid resin commercially available from British Industrial Plastics Limited and has a solids content of 90% (SRY solids content 80%).

The procedure followed is given below in tabular form in Table VIII.

TABLE VIII

| Time (Mins) | Temperature inside reaction vessel (°C.) | pH | Notes |
|---|---|---|---|
| 0 | 22 | | BC 309 Resin charged, heating and stirring begun |
| 20 | 62 | 9 | Paraform addition begun Temperature kept at 60 to 65° C. |
| 80 | 63 | 9 | Paraform addition complete not dissolved but mix easily stirrable |
| 130 | 60 | 8.5 | Paraform still undissolved urea addition begun, keeping the temperature at 60 to 65° C. |
| 170 | 62 | 8.5 | urea addition complete, solids dissolving, white opaque liquid. Increase temperature |
| 195 | 81 | 8.5 | Solids dissolved, temperature held at 80 to 85° C. |
| 205 | 82 | | heating stopped, cooling resin |
| 216 | 77 | 8.5 | Clear resin with dispersed air bubbles. Sample taken for solids determination. |
| 305 | 38 | | Resin bottled. |

The resin produced was a pasty solid when cold, and had an SRY solids content of 79.8%.

It should be noted that the SRY solids content quoted in the above Examples were measured by heating weighed samples of the resins for 3 hours, at 120° C. to drive off water of reaction, the residue being regarded as the solids content of the resin. These values should therefore not be confused with the frequently quoted value of resin solids in aqueous solution, in which the non-aqueous content is all taken to be solids, and therefore is generally a very much higher percentage figure.

We claim:

1. A method for the manufacture of an amino-formaldehyde resin of low water content which comprises reacting at a temperature above 60° C. in a liquid phase an amino compound with formaldehyde in a reaction system using as solvent an amino-formaldehyde resin which reacts with further monomers and which resin is in the form of one of a liquid resin and an aqueous solution of at least 50% solids content, and renders the mixture of reactants liquid at least at the temperature at which the reaction is to be carried out, the amino compound and the formaldehyde being introduced into said solvent in a solid form, neither dissolved nor dispersed in water, no further water being added to the reaction mixture to dissolve said amino compound and formaldehyde, said amino compound and formaldehyde being added to the solvent separately under alkaline conditions, the reaction mixture when all three ingredients are at present being reacted under alkaline or acidic conditions, as appropriate, to obtain a desired reaction rate, and the final product being subsequently neutralized or made alkaline before storage.

2. A method according to claim 1 in which the reaction is carried out at a temperature above 60° C.

3. A method according to claim 1 in which the reaction is carried out between 70° C. and 115° C.

4. A method according to claim 1 in which the reactive modifier is a resin containing the same monomers in the same ratio as the resin being manufactured.

5. A method according to claim 1 in which the amino compound to be reacted with formaldehyde or paraformaldehyde is melamine or urea.

6. A method according to claim 1 in which the reactive modifier is selected from the group consisting of urea formaldehyde resins, melamine formaldehyde resins and methylated melamine formaldehyde resins.

7. A method according to claim 1 in which the amount of water present in the reaction mixture is less than 6% by weight of the total mixture.

8. A method for the manufacture of an amino-formaldehyde resin of low water content which comprises reacting at a temperature above 60° C. in a liquid phase an amino compound with formaldehyde wherein
(i) as solvent in the liquid phase reaction mixture is used an amino-formaldehyde resin capable of reaction with further monomers and capable of rendering said mixture liquid at least at the reaction temperature which resin is in the form of a liquid resin or an aqueous solution of at least 50% solids resin content,
(ii) the amino compound is introduced to the solvent in a solid form and the formaldehyde is introduced to the solvent as solid paraform and
(iii) the amount of said solvent resin used constitutues not more than 40 mole percent of the resin produced, said amino compound and formaldehyde being added to the solvent separately under alkaline conditions, the reaction mixture when all three ingredients are at present being reacted under alkaline or acidic conditions, as appropriate, to obtain a desired reaction rate, and the final product being subsequently neutralized or made alkaline before storage.

9. A method for the manufacture of an amino-formaldehyde resin of low water content which comprises reacting at a temperature above 60° C., in a liquid phase, an amino compound with formaldehyde wherein
(i) as solvent in the liquid phase reaction mixture is used an amino-formaldehyde resin capable of reaction with further monomers and capable of rendering said mixture liquid at least at the reaction temperature which resin is in the form of a liquid resin or an aqueous solution of at least 50% solids resin content
(ii) the reaction is carried out by stepwise separate addition of solid paraformaldehyde and solid amino compound to said solvent at elevated temperature to obtain said liquid phase reaction mixture
(iii) the amount of said reactive solvent resin is not more than 40 mole percent of the resin produced, said amino compound and formaldehyde being added to the solvent separately under alkaline conditions, the reaction mixture when all three ingredients are at present being reacted under alkaline or acidic conditions, as appropriate, to obtain a desired reaction rate, and the final product being subsequently neutralized or made alkaline before storage and
(iv) the amount of added water in said reaction mixture not including water formed by condensation of said reactants, is not more than about 17% by weight.

* * * * *